F. G. KEYES.
SEAL FOR ELECTRIC APPARATUS.
APPLICATION FILED JULY 7, 1914.
1,288,916. Patented Dec. 24, 1918.
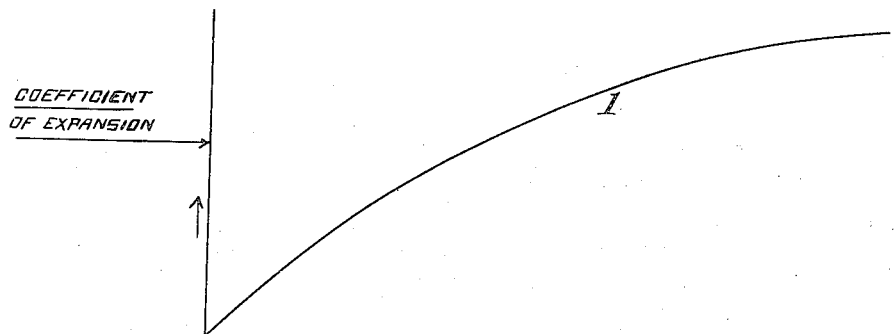
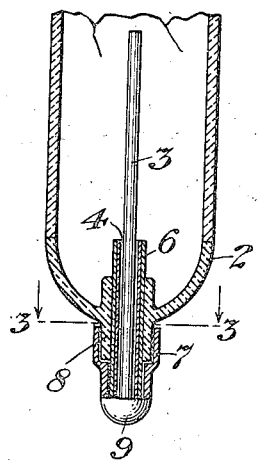
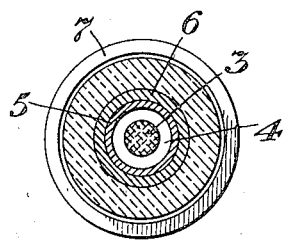
WITNESSES
INVENTOR
Frederick G. Keyes
BY
George H. Stocke Jr.
his ATTORNEY

UNITED STATES PATENT OFFICE.

FREDERICK G. KEYES, OF EAST ORANGE, NEW JERSEY, ASSIGNOR TO COOPER HEWITT ELECTRIC COMPANY, OF HOBOKEN, NEW JERSEY, A CORPORATION OF NEW JERSEY.

SEAL FOR ELECTRIC APPARATUS.

1,288,916.

Specification of Letters Patent.  Patented Dec. 24, 1918.

Application filed July 7, 1914. Serial No. 849,445.

*To all whom it may concern:*

Be it known that I, FREDERICK G. KEYES, a citizen of the United States, and resident of East Orange, county of Essex, State of New Jersey, have invented certain new and useful Improvements in Seals for Electric Apparatus, of which the following is a specification.

It has been proposed, notably by Charles A. Kraus in United States Patent No. 1,093,997, to construct a conducting seal for vacuum containers of a tube of conductive material sealed through the container wall, the co-efficient of thermal expansion of the tube being greater than that of the container material.

It has also been proposed, for example by Byron E. Eldred in United States Patent No. 1,083,070, to utilize for the conducting seal passing through the glass wall of a wire of high melting metallic material, said wire being of a rate of expansion materially less than the wall and being held therein under compressive strain. In both the Kraus and the Eldred patents the wall of the container is of vitreous material, such as glass.

The present invention has to do with the providing of a seal for containers of vitreous material, the material of the seal being in the form of a composite tube whose co-efficient of thermal expansion lies within a region having as its highest limit an expansion co-efficient equal to that of glass or quartz, and an arrangement of the sealing and leading-in elements whereby the tendency of the current passing to heat the sealing elements is avoided and greater current carrying capacity is obtained.

My invention is illustrated in the accompanying drawings in which Figure 1 is a diagram showing the expansion curves of diagram vitreous material such as may form the substance of a vacuum container;

Fig. 2 is a vertical section of a portion of said container having my improved seal applied thereto and Fig. 3 is an enlarged transverse section thereof along the line 3, 3 in Fig. 2.

In Fig. 1 the curve, 1, shows graphically the relation of the expansion of vitreous material, glass, for example, under the influence of temperature. The vitreous material may be such as is shown at 2 in Figs. 2 and 3 and within it may be arranged the conducting elements of the seal which I apply thereto. These conducting elements consist of a copper core, 3, surrounded, with an intervening space, as shown at 4, by a tube, 5, of nickel steel. The proportions of the elements of the nickel steel tube may, it is well known, be so selected as to vary greatly its co-efficient of expansion. From this it results that the proportion may be chosen which will cause its thermal expansion to approximate that of the vitreous material 2. When, therefore, the nickel steel tube is closely surrounded by a tube of platinum, 6, as is proposed herein, said platinum tube being securely welded to the tube 5, the tubular structure as a whole will be approximately the same in respect to expansion under heat as the glass or other vitreous material through which it is sealed. It may be lower and still, owing to the elastic or yielding nature of the tubes 5 and 6, they will adapt themselves to the external compression without injury to the vitreous material.

The rounding off of the seal at its outer end is accomplished by a metallic piece, 7, following the shape of a boss, 8, on the vitreous material 2, and also of the outer part of the tube 6, but separated from both, and a cap, 9, welded to the end of the copper rod 3 and to the tubes 5 and 6. The described conducting member is designed to be sealed into the glass, for example, of a vacuum electric lamp.

The advantages arising from the use of my invention are based not merely upon the materials chosen for the conducting member, but also upon the fact that by the use of nickel steel in tubular form the said conducting member is made elastic or yielding to a degree sufficient for the purposes of practical use. Moreover the beneficial effect of the copper core in producing the contact with conducting material inside the container is heightened by the provision of a cooling space between it and the nickel steel tube within which it stands.

I have mentioned platinum as the material of the outer tube, but it is obvious that gold or any non-oxidizable metal of sufficiently high melting point may be employed.

I claim as my invention:

1. The combination with a vacuum container of non-conducting material, of a composite conducting tube consisting of a nickel steel inner tube and a platinum outer tube welded thereto, the coefficient of thermal expansion of the composite tube lying within a region whose highest limit is equal to the expansion coefficient of the container material.

2. In a seal, a member of non-conducting material and a composite tube of conductive material sealed through the non-conducting member, the said composite tube comprising an inner tube of nickel steel and an outer tube of platinum, the coefficient of thermal expansion of the tube lying within a region whose highest limit is equal to the expansion coefficient of the member through which it is sealed.

3. The combination with a vacuum container of vitreous material, of a composite conducting tube consisting of a nickel steel inner tube and a platinum outer tube welded thereto, the coefficient of thermal expansion of the composite tube lying within a region whose highest limit is equal to the expansion coefficient of the container material.

4. In a seal, a member of vitreous material and a composite tube of conductive material sealed through the vitreous member, the said composite tube comprising an inner tube of nickel steel and an outer tube of platinum, the coefficient of thermal expansion of the tube lying within a region whose highest limit is equal to the expansion coefficient of the member through which it is sealed.

5. In a seal for vitreous material a conducting member comprising a central copper rod, a tube of nickel steel surrounding the same with an intervening space, an outer tube of platinum welded to the aforesaid tube and a metallic cap uniting the said members by being sealed thereto.

6. The combination with a vacuum container of non-conducting material, of a composite conducting tube sealed through the container material, the said tube consisting of a yielding inner tube of a material having a coefficient of thermal expansion lying within a region whose highest limit is equal to the expansion coefficient of the container material and a platinum outer tube welded thereto.

7. In a seal, a member of non-conducting material and a composite tube of conductive material sealed through the non-conducting member, the said composite tube comprising a yielding inner tube having a coefficient of thermal expansion lying within a region whose highest limit is equal to the expansion coefficient of the member through which it is sealed and an outer tube of platinum.

8. The combination with a vacuum container of vitreous material, of a composite conducting tube consisting of a yielding inner tube of a material having a coefficient of thermal expansion lying within a region whose highest limit is equal to the expansion coefficient of the container material, and an outer platinum tube welded thereto.

9. In a seal, a member of vitreous material and a composite tube of conducting material sealed through the vitreous member, the said composite tube comprising a yielding inner tube of a material having a coefficient of thermal expansion lying within a region whose highest limit is equal to the expansion coefficient of the member through which it is sealed, and an outer tube of platinum.

Signed at New York, in the county of New York and State of New York, this 6th day of July, A. D. 1914.

FREDERICK G. KEYES.

Witnesses:
GEORGE H. STOCKBRIDGE,
THOS. H. BROWN.